United States Patent
Chu et al.

(10) Patent No.: US 7,145,838 B2
(45) Date of Patent: Dec. 5, 2006

(54) METHOD AND APPARATUS FOR PERFORMING TARGET SEARCH ON OPTICAL STORAGE DISC

(75) Inventors: Chin-Huo Chu, Kao-Hsiung Hsien (TW); Hao-Cheng Chen, Taipei Hsien (TW); Wen-Yi Wu, Hsin-Chu Hsien (TW)

(73) Assignee: Mediatek Incorporation, Hsin-Chu Hsien (TW)

(*) Notice: Subject to any disclaimer, the term of this patent is extended or adjusted under 35 U.S.C. 154(b) by 336 days.

(21) Appl. No.: 10/711,068

(22) Filed: Aug. 20, 2004

(65) Prior Publication Data

US 2005/0249058 A1  Nov. 10, 2005

(30) Foreign Application Priority Data

May 6, 2004  (TW) ................ 93112761 A

(51) Int. Cl.
   G11B 7/00  (2006.01)
(52) U.S. Cl. .................. 369/30.1; 369/44.28
(58) Field of Classification Search .......... 369/30.1, 369/44.28
   See application file for complete search history.

(56) References Cited

U.S. PATENT DOCUMENTS

| 5,245,595 | A | * | 9/1993 | Yasukawa | 369/30.12 |
| 5,870,375 | A | * | 2/1999 | Maeda et al. | 369/30.1 |
| 5,995,318 | A | * | 11/1999 | Hasegawa et al. | 360/78.14 |
| 6,683,825 | B1 | * | 1/2004 | Sato | 369/30.23 |
| 2002/0034132 | A1 | * | 3/2002 | Sato | 369/30.23 |

* cited by examiner

Primary Examiner—Thang V. Tran
(74) Attorney, Agent, or Firm—Winston Hsu

(57) ABSTRACT

An optical storage disc stores storage information and includes track information. A method for performing a target search on the optical storage disc includes: generating a first intermediate signal according to a readout signal generated by an optical storage device reading the storage information; generating a second intermediate signal according to the track information carried within the readout signal; generating a hybrid address signal according to the first intermediate signal and the second intermediate signal; and performing the target search on the optical storage disc according to the hybrid address signal and a target address set by the optical storage device.

20 Claims, 4 Drawing Sheets

METHOD AND APPARATUS FOR PERFORMING TARGET SEARCH ON OPTICAL STORAGE DISC

BACKGROUND OF INVENTION

1. Field of the Invention

The present invention relates to a method and an apparatus for performing target search on an optical storage disc, and more particularly, to a method and an apparatus for performing target search on an optical storage disc according to a hybrid address signal.

2. Description of the Prior Art

As the data processing speed of computer systems greatly increases and the requirement of more massive data storage is correspondingly introduced, optical storage discs that are cost-effective and compact while having larger storage volumes and high access speeds have become popular storage media. Accordingly, an optical storage device for accessing the optical storage discs becomes essential and necessary. Digital Versatile Discs (DVDs) and DVD drives are typical of the optical storage discs and optical storage devices mentioned above, respectively. When an optical storage device is going to read specific data within an optical storage disc, the optical storage device firstly performs a target search on the optical storage disc to find a location of the specific data. The optical storage device then compares address information read through an optical pickup module of the optical storage device from the optical storage disc with a target address. If the address information read through the optical pickup module matches with the target address, the target search is complete.

According to a prior art method of target search, the address information can be address information of physical wobbles on the optical storage disc, i.e. physical addresses. Normally, pre-grooves of a blank optical storage disc include the information of the physical addresses. However, it is not easy to read the physical wobbles if data is already written on the optical storage disc since the data writing process usually degrades the quality of the physical wobbles. As a result, the optical storage device is either unable to perform the target search or performs the target search inaccurately.

According to another prior art method of target search, the address information can be address information corresponding to storage information stored within the optical storage disc, i.e. logical addresses. However, the accuracy of the logical addresses corresponds to the accuracy of a location of the storage information stored within the optical storage disc. If data recording shift when writing the storage information to the optical storage disc occurs, the target search performed according to the logical addresses will be inaccurate due to the data recording shift.

As mentioned above, neither the prior art method of target search according to the physical addresses nor the prior art method of target search according to the logical addresses will ensure that the optical storage device correctly performs the target search.

SUMMARY OF INVENTION

It is therefore an objective of the present invention to provide a method and an apparatus for performing a target search on an optical storage disc according to a hybrid address signal.

The present invention provides a method for performing a target search on an optical storage disc. The optical storage disc stores storage information, and the optical storage disc includes track information. The method includes: generating a first intermediate signal according to a readout signal generated by an optical storage device reading the storage information; generating a second intermediate signal according to the track information carried within the readout signal; generating a hybrid address signal according to the first and second intermediate signals, wherein the hybrid address signal corresponds to the first and second intermediate signals, and the hybrid address signal is synchronized with the second intermediate signal; and performing the target search on the optical storage disc according to the hybrid address signal and a target address set by the optical storage device.

Accordingly, the present invention further provides a circuit installed in an optical storage device for performing a target search on an optical storage disc. The optical storage disc stores storage information, and the optical storage disc includes track information. The circuit includes: a first signal generator for generating a first intermediate signal according to a readout signal generated by the optical storage device reading the storage information; a second signal generator for generating a second intermediate signal according to the track information carried within the readout signal; a third signal generator electrically connected to the first and second signal generators for generating a hybrid address signal according to the first and second intermediate signals, wherein the hybrid address signal corresponds to the first and second intermediate signals, and the hybrid address signal is synchronized with the second intermediate signal; and a target search module electrically connected to the third signal generator for performing the target search on the optical storage disc according to the hybrid address signal and a target address set by the optical storage device.

It is an advantage of the present invention that the present invention method and device generate the hybrid address signal according to physical addresses and logical addresses and perform the target search according to the hybrid address signal so that the present invention provides better performance in contract to the prior art. When interruption of decoding the physical addresses occurs, the present invention method and device continuously generate the second intermediate signal according to a period thereof, i.e. the period of the previously generated second intermediate signal, so that the hybrid address signal is continuously generated. Therefore, the present invention ensures that the target search performed by the optical storage device according to the hybrid address signal is correct.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
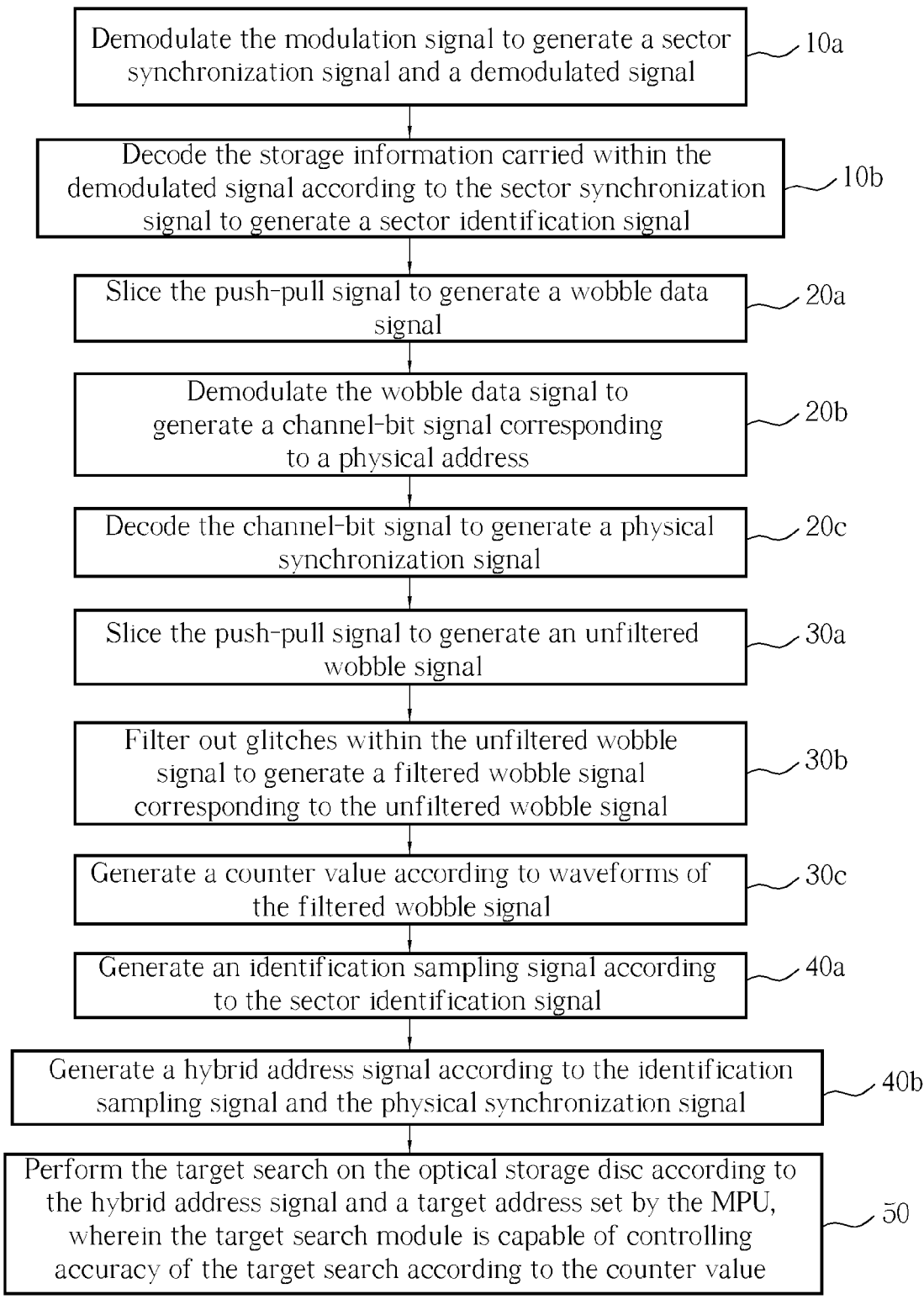
FIG. 1 is a flowchart of a method for performing a target search according to the present invention.
Figure 2:
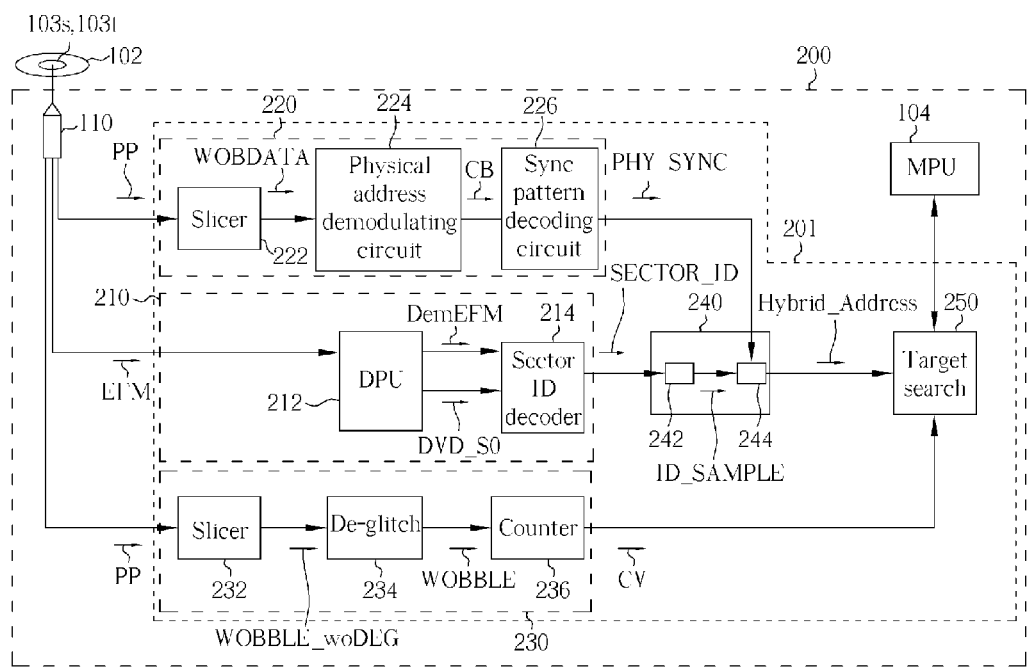
FIG. 2 is a diagram of a circuit for performing a target search according to the present invention.

Please refer to FIG. 1 and FIG. 2 for a preferred embodiment of the present invention. FIG. 1 is a flowchart of a method for performing a target search according to the present invention. FIG. 2 illustrates a circuit 201 installed in an optical storage device 200 for performing the target search on an optical storage disc 102. The optical storage device 200 includes a micro-processing unit (MPU) 104 and an optical pickup module 110. In the present embodiment, the optical storage disc 102 is a Digital Versatile Disk (DVD) 102 and the optical storage device 200 is a DVD drive 200, wherein the DVD 102 and the DVD drive 200 are well known in the art. The optical storage disc 102 stores storage information 103s, wherein the storage information 103s includes logical addresses. With a viewpoint regarding modulation format, a readout signal generated by the optical pickup module 110 reading the storage information 103s within the optical storage disc 102 is referred to as an eight to fourteen modulation (EFM) signal. In addition, the optical storage disc 102 includes track information 103t, i.e. information of physical wobbles well known in the art. With a viewpoint regarding waveforms, the readout signal is also referred to as a push-pull signal PP.

As shown in FIG. 2, the circuit 201 includes a sector identification signal generator 210, a physical synchronization signal generator 220, a counting module 230, an identification sampler (ID sampler) 240, and a target search module 250. The sector identification signal generator 210 includes a data path unit (DPU) 212 and a sector identification decoder 214. The physical synchronization signal generator 220 includes a slicer 222, a physical address demodulating circuit 224, and a sync pattern decoding circuit 226. The counting module 230 includes a slicer 232, a de-glitch unit 234, and a counter 236. In addition, the ID sampler 240 includes an identification sampling signal generating unit 242 and a hybrid address signal generating unit 244. The present invention method is described using the following steps according to the preferred embodiment, however, the order of the steps is not a limitation to the present invention.

Step 10a: Demodulate the modulation signal EFM using the DPU 212 to generate a sector synchronization signal DVD_S0 and a demodulated signal DemEFM.

Figure 3:
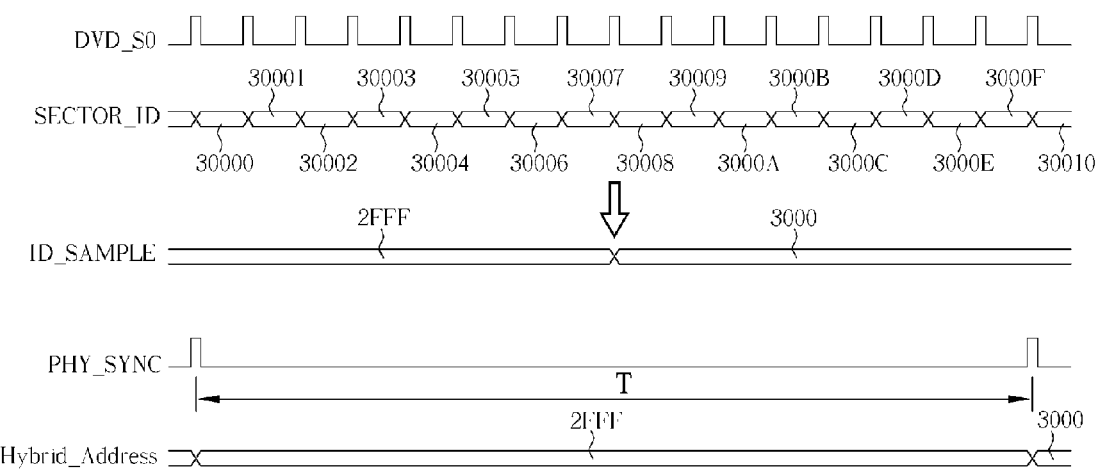
FIG. 3 is a diagram of signals of the circuit shown in FIG. 2.

Step 10b: Decode the storage information 103s carried within the demodulated signal DemEFM according to the sector synchronization signal DVD_S0 using the sector identification decoder 214 to generate a sector identification signal SECTOR_ID, wherein the sector identification signal SECTOR-ID includes logical addresses 30000, 30001, . . . , etc., each of the logical addresses 30000, 30001, . . . , etc. corresponds to one of the sectors 30000, 30001, . . . , etc., respectively, and a starting location of each of the logical addresses 30000, 30001, . . . , etc. corresponds to a pulse of the sector synchronization signal DVD_S0, respectively, as shown in FIG. 3.

Step 20a: Slice the push-pull signal PP using the slicer 222 to generate a wobble data signal WOBDATA.

Step 20b: Demodulate the wobble data signal WOBDATA using the physical address demodulating circuit 224 to generate a channel-bit signal CB corresponding to a physical address.

Step 20c: Decode the channel-bit signal CB using the sync pattern decoding circuit 226 to generate a physical synchronization signal PHY_SYNC, wherein when interruption of the wobble data signal WOBDATA together with the channel-bit signal CB occurs, the sync pattern decoding circuit 226 continuously generates the physical synchronization signal PHY_SYNC according to a period T thereof, i.e. the period T of the previously generated physical synchronization signal PHY_SYNC shown in FIG. 3. The period T shown in FIG. 3 corresponds to an Error Correction Code (ECC) block. In this embodiment, each ECC block corresponds to sixteen sectors.

Step 30a: Slice the push-pull signal PP using the slicer 232 to generate an unfiltered wobble signal WOBBLE_woDEG.

Step 30b: Filter out glitches within the unfiltered wobble signal WOBBLE_woDEG using the de-glitch unit 234 to generate a filtered wobble signal WOBBLE corresponding to the unfiltered wobble signal WOBBLE_woDEG.

Step 30c: Generate a counter value CV according to waveforms of the filtered wobble signal WOBBLE using the counter 236. The counter value CV corresponds to the rise and fall of the waveforms of the wobble signal WOBBLE.

Step 40a: Generate an identification sampling signal ID_SAMPLE according to the sector identification signal SECTOR_ID using the identification sampling signal generating unit 242, wherein the identification sampling signal ID_SAMPLE includes at least one simplified address 3000 of the logical addresses 30000, 30001 . . . , etc., of which the least significant bits (LSB) 0, 1, . . . , etc. are omitted, carried within the sector identification signal SECTOR_ID. In the present embodiment, a starting location of the simplified address 3000 of the identification sampling signal ID_SAMPLE corresponds to a location between the logical addresses 30007 and 30008 of the sector identification signal SECTOR_ID as shown in FIG. 3.

Step 40b: Generate a hybrid address signal Hybrid_Address according to the identification sampling signal ID_SAMPLE and the physical synchronization signal PHY_SYNC using the hybrid address signal generating unit 244, wherein the hybrid address signal Hybrid_Address includes the simplified addresses 2FFF, 3000 . . . , etc. corresponding to the simplified addresses 2FFF, 3000, . . . , etc. of the identification sampling signal ID_SAMPLE. In the present embodiment, starting locations of the simplified addresses 2FFF, 3000 . . . . , etc. of the hybrid address signal Hybrid_Address are synchronized with the physical synchronization signal PHY_SYNC as shown in FIG. 3.

Step 50: Perform the target search on the optical storage disc 102 according to the hybrid address signal Hybrid_Address and a target address set by the MPU 104 using the target search module 250, wherein the target search module 250 is capable of controlling accuracy of the target search according to the counter value CV.

Each of the simplified addresses 2FFF, 3000 . . . , etc. mentioned above corresponds to sixteen logical addresses. For example, the simplified address 3000 corresponds to the sixteen logical addresses 30000, 30001, . . . , and 3000F. As a result, the simplified address 3000 corresponds to an ECC block 3000. That is, the simplified addresses 2FFF, 3000 . . . , etc. carried within the hybrid address signal Hybrid_Address correspond to ECC blocks 2FFF, 3000 . . . , etc., respectively. When the target search module 250 finds the target address in the hybrid address signal Hybrid_Address, the target search is completed. Furthermore, when the optical storage disc 102 does not store any storage information 103s, the target search module 250 performs the target search according to the counter value CV so that the present invention method and device appropriately operate in such situation.

Figure 4:
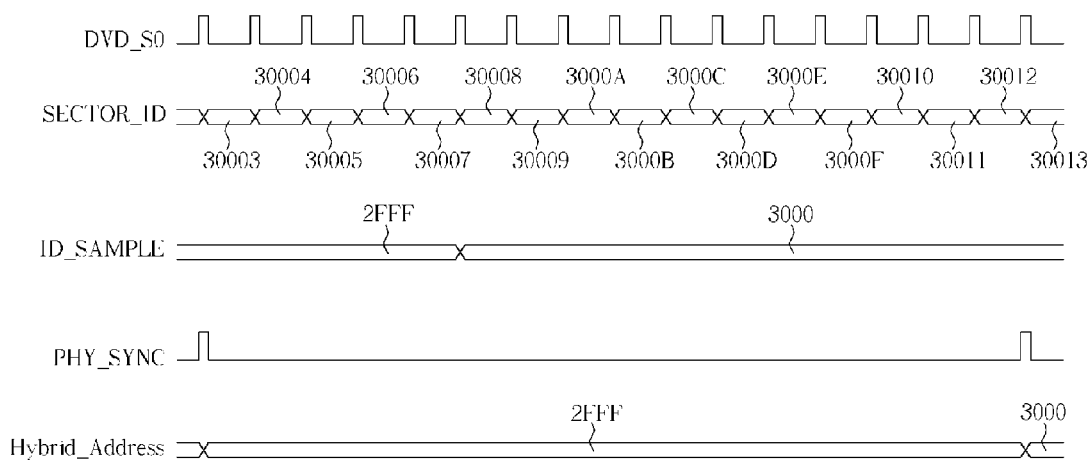
FIG. 4 is a diagram of the hybrid address signal's timing error tolerance of the sector identification signal shown in FIG. 3.

Please refer to FIG. 3 and FIG. 4 at the same time. FIG. 4 is a diagram of the hybrid address signal's timing error tolerance of the sector identification signal SECTOR_ID shown in FIG. 3. The hybrid address signal Hybrid_Address is generated correctly as long as the sector identification signal SECTOR_ID has a timing error corresponding to a data length within half an ECC block. In the preferred embodiment, a starting location of the logical address 30000 of the sector identification signal SECTOR_ID shown in FIG. 3 is aligned with a pulse of the physical synchronization signal PHY_SYNC. In this situation, the sector identification signal SECTOR_ID has no timing error. Suppose that the optical storage disc 102 has been written the storage information 103s by an optical disc burner with poor quality so that a starting location of the logical address 30003 of the sector identification signal SECTOR_ID is aligned with a pulse of the physical synchronization signal PHY_SYNC as shown in FIG. 4. In this situation, the sector identification signal SECTOR_ID has a timing error of three sectors. However, in both situations shown in FIG. 3 and FIG. 4 respectively, the synchronization relationships between the hybrid address signal Hybrid_Address and the physical synchronization signal PHY_SYNC are the same. As long as the timing error generated during a writing process of the storage information 103s does not exceed a length corresponding to eight sectors, the hybrid address signal Hybrid_Address will be generated correctly. As a result, the present invention method and circuit 201 greatly enhance the performance of the optical storage device 200. According to the present invention, the optical storage device 200 has better tolerance of timing errors of the logical addresses carried within the readout signal due to data recording shift of the optical storage disc 102 in contrast to the prior art. Therefore, it is ensured that the optical storage device 200 accurately performs the target search according to the hybrid address signal Hybrid_Address.

In another embodiment of the present invention, a shifted target address is calculated by adding a predetermined value to the target address, and step 50 performs the target search on the optical storage disc 102 by finding the shifted target address in the hybrid address signal Hybrid_Address. Therefore, the present invention is capable of operating within the characteristic variance of the optical storage device 200 by adjusting the shift target address.

It is an advantage of the present invention that the present invention method and device generate the hybrid address signal according to physical addresses and logical addresses and perform the target search according to the hybrid address signal so that the present invention provides better performance in contract to the prior art. When interruption of decoding the physical addresses occurs, the present invention method and device continuously generate the second intermediate signal according to the period thereof, i.e. the period of the previously generated second intermediate signal, so that the hybrid address signal is continuously generated. Therefore, the present invention ensures that the optical storage device correctly performs the target search according to the hybrid address signal.

It is another advantage of the present invention that the hybrid address signal will be generated correctly while the sector identification signal having a timing error corresponding to a data length within half an ECC block. Therefore, the optical storage device's tolerance of the timing error ensures that the optical storage device accurately performs the target search according to the hybrid address signal.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing a target search on an optical storage disc, the optical storage disc storing storage information and including track information, the method comprising the following steps:
    (a) generating a first intermediate signal according to a readout signal generated by an optical storage device reading the storage information;
    (b) generating a second intermediate signal according to the track information carried within the readout signal;
    (c) generating a hybrid address signal according to the first and second intermediate signals, wherein the hybrid address signal corresponds to the first and second intermediate signals, and the hybrid address signal is synchronized with the second intermediate signal; and
    (d) performing the target search on the optical storage disc according to the hybrid address signal and a target address set by the optical storage device.

2. The method of claim 1, wherein the storage information includes logical addresses, and step (a) generates the first intermediate signal according to the logical addresses.

3. The method of claim 2, wherein the optical storage disc is a Digital Versatile Disk (DVD), the first intermediate signal is a sector identification signal, and step (a) further comprises:
    demodulating the readout signal to generate a sector synchronization signal and a demodulated signal; and
    decoding the storage information carried within the demodulated signal according to the sector synchronization signal to generate the first intermediate signal.

4. The method of claim 1, wherein the track information is information of physical wobbles, and step (b) generates the second intermediate signal according to the information of the physical wobbles.

5. The method of claim 4, wherein the optical storage disc is a Digital Versatile Disk (DVD), the second intermediate signal is a physical synchronization signal, and step (b) further comprises:
    slicing the readout signal to generate a wobble data signal;
    demodulating the wobble data signal to generate a channel-bit signal corresponding to a physical address; and
    decoding the channel-bit signal to generate the second intermediate signal, wherein when interruption of the wobble data signal together with the channel-bit signal occurs, generating the second intermediate signal according to a period of the previously generated physical synchronization signal.

6. The method of claim 1, wherein the optical storage disc is a Digital Versatile Disk (DVD), the first intermediate signal is a sector identification signal, the second intermediate signal is a physical synchronization signal, and step (c) further comprises:
    generating an identification sampling signal according to the first intermediate signal, wherein the identification sampling signal includes simplified information of logical addresses carried within the first intermediate signal, and the identification sampling signal corresponds to the first intermediate signal; and
    generating the hybrid address signal according to the identification sampling signal and the second intermediate signal, wherein the hybrid address signal includes the simplified information, and the hybrid address signal corresponds to the identification sampling signal and the second intermediate signal.

7. The method of claim 1 further comprising:
(e) generating a counter value according to the readout signal;
wherein step (d) is capable of controlling accuracy of the target search according to the counter value.

8. The method of claim 7, wherein the optical storage disc is a Digital Versatile Disk (DVD), the first intermediate signal is a sector identification signal, the second intermediate signal is a physical synchronization signal, and step (e) further comprises:
slicing the readout signal to generate a wobble signal; and
generating the counter value according to a waveform of the wobble signal.

9. The method of claim 8, wherein step (e) further comprises:
filtering out a glitch within the wobble signal.

10. The method of claim 7, wherein when the optical storage disc does not store any storage information, step (d) further comprises performing the target search according to the counter value.

11. A circuit installed in an optical storage device for performing a target search on an optical storage disc, the optical storage disc storing storage information and including track information, the circuit comprising:
a first signal generator for generating a first intermediate signal according to a readout signal generated by the optical storage device reading the storage information;
a second signal generator for generating a second intermediate signal according to the track information carried within the readout signal;
a third signal generator electrically connected to the first and second signal generators for generating a hybrid address signal according to the first and second intermediate signals, wherein the hybrid address signal corresponds to the first and second intermediate signals, and the hybrid address signal is synchronized with the second intermediate signal; and
a target search module electrically connected to the third signal generator for performing the target search on the optical storage disc according to the hybrid address signal and a target address set by the optical storage device.

12. The circuit of claim 11, wherein the storage information includes logical addresses, and the first signal generator generates the first intermediate signal according to the logical addresses.

13. The circuit of claim 12, wherein the optical storage disc is a Digital Versatile Disk (DVD), the first intermediate signal is a sector identification signal, and the first signal generator further comprises:
a data path unit (DPU) for demodulating the readout signal to generate a sector synchronization signal and a demodulated signal; and
a sector identification decoder electrically connected to the DPU and the third signal generator for decoding the storage information carried within the demodulated signal according to the sector synchronization signal to generate the first intermediate signal.

14. The circuit of claim 11, wherein the track information is information of physical wobbles, and the second signal generator generates the second intermediate signal according to the information of the physical wobbles.

15. The circuit of claim 14, wherein the optical storage disc is a Digital Versatile Disk (DVD), the second intermediate signal is a physical synchronization signal, and the second signal generator further comprises:
a slicer for slicing the readout signal to generate a wobble data signal;
a physical address demodulating circuit electrically connected to the slicer for demodulating the wobble data signal to generate a channel-bit signal corresponding to a physical address; and
a sync pattern decoding circuit electrically connected to the physical address demodulating circuit and the third signal generator for decoding the channel-bit signal to generate the second intermediate signal, wherein when interruption of the wobble data signal together with the channel-bit signal occurs, the sync pattern decoding circuit generates the second intermediate signal according to a period of the previously generated physical synchronization signal.

16. The circuit of claim 11, wherein the optical storage disc is a Digital Versatile Disk (DVD), the first intermediate signal is a sector identification signal, the second intermediate signal is a physical synchronization signal, and the third signal generator further comprises:
an identification sampling signal generating unit electrically connected to the first signal generator for generating an identification sampling signal according to the first intermediate signal, wherein the identification sampling signal includes simplified information of logical addresses carried within the first intermediate signal, and the identification sampling signal corresponds to the first intermediate signal; and
a hybrid address signal generating unit electrically connected to the identification sampling signal generating unit and the second signal generator for generating the hybrid address signal according to the identification sampling signal and the second intermediate signal, wherein the hybrid address signal includes the simplified information, and the hybrid address signal corresponds to the identification sampling signal and the second intermediate signal.

17. The circuit of claim 11 further comprising:
a counting module electrically connected to the target search module for generating a counter value according to the readout signal;
wherein the target search module is capable of controlling accuracy of the target search according to the counter value.

18. The circuit of claim 17, wherein the counting module further comprises:
a slicer for slicing the readout signal to generate a wobble signal; and
a counter coupled to the slicer and the target search module for generating the counter value according to a waveform of the wobble signal.

19. The circuit of claim 18, wherein the counting module further comprises:
a de-glitch unit electrically connected to the slicer and the counter for filtering out a glitch within the wobble signal.

20. The circuit of claim 17, wherein when the optical storage disc does not store any storage information, the target search module performs the target search according to the counter value.

* * * * *